(12) United States Patent
Vincent et al.

(10) Patent No.: US 7,371,273 B2
(45) Date of Patent: May 13, 2008

(54) LATEXES AND INK-JET INKS PREPARED USING BLOCKED ACID MONOMERS

(75) Inventors: Kent D. Vincent, Cupertino, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/741,536

(22) Filed: Dec. 19, 2003

(65) Prior Publication Data

US 2005/0137319 A1  Jun. 23, 2005

(51) Int. Cl.
*C09D 11/00* (2006.01)
*C08F 8/12* (2006.01)
*C08F 246/00* (2006.01)
*C08F 212/14* (2006.01)
*C08F 220/18* (2006.01)

(52) U.S. Cl. ............... 106/31.25; 106/31.6; 524/547; 524/556; 524/599; 524/609; 524/610; 524/612; 524/853

(58) Field of Classification Search ............. 106/31.25, 106/31.6; 524/547, 556, 599, 609, 610, 612, 524/853
See application file for complete search history.

(56) References Cited

U.S. PATENT DOCUMENTS

| | | | | |
|---|---|---|---|---|
| 5,708,095 A | * | 1/1998 | Grezzo Page et al. | 525/301 |
| 5,936,008 A | * | 8/1999 | Jones et al. | 523/161 |
| 5,981,651 A | * | 11/1999 | Patel et al. | 524/773 |
| 5,990,202 A | | 11/1999 | Nguyen et al. | |
| 6,031,019 A | * | 2/2000 | Tsutsumi et al. | 523/160 |
| 6,057,384 A | | 5/2000 | Nguyen et al. | |
| 6,239,193 B1 | * | 5/2001 | Cheng et al. | 523/160 |
| 6,306,994 B1 | * | 10/2001 | Donald et al. | 526/317.1 |
| 6,417,249 B1 | | 7/2002 | Nguyen et al. | |
| 6,541,590 B1 | * | 4/2003 | Johnson et al. | 526/281 |
| 2002/0198287 A1 | * | 12/2002 | Ohta et al. | 523/160 |
| 2003/0176532 A1 | * | 9/2003 | Chung et al. | 523/160 |

FOREIGN PATENT DOCUMENTS

| | | | |
|---|---|---|---|
| EP | 869160 A2 | * | 10/1998 |
| EP | 1108758 A2 | * | 6/2001 |
| FR | 2 676 451 | | 11/1992 |
| JP | 62283174 A | * | 12/1987 |
| WO | WO 01/85808 A1 | | 11/2001 |

* cited by examiner

*Primary Examiner*—Kelechi C. Egwim

(57) ABSTRACT

The present is drawn to the use of blocked acid monomers for the incorporation of highly acidic groups, such as strong acids and multiple acids, on the surface of latex particles via emulsion polymerization. In accordance with this, a method of forming latex particulates having high charge density surfaces can comprise the steps of preparing a monomer emulsion including an aqueous phase and an organic monomer phase, wherein the organic monomer phase includes at least one blocked acid monomer; polymerizing the organic monomer phase to form blocked acid latex particulates dispersed in the aqueous phase; and unblocking the blocked acid latex particulates to form acidified latex particulates.

9 Claims, No Drawings

LATEXES AND INK-JET INKS PREPARED USING BLOCKED ACID MONOMERS

FIELD OF THE INVENTION

The present invention relates generally to blocked acid monomers and their use for the incorporation of highly acidic groups, such as strong acids and multiple acids, on the surface of latex particles via emulsion polymerization. Such modified latexes can be used effectively in latex-containing ink-jet inks.

BACKGROUND OF THE INVENTION

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers. Though there has been great improvement in ink-jet printing technology, there is still improvement that can be made in many areas.

With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks typically have low viscosity to accommodate high frequency jetting and firing chamber refill processes common to ink-jet pens.

In addition to general image fade that occurs in many ink-jet ink systems, ink-jet prints have also been known for poor durability when exposed to water or high humidity. This results from the use of water-soluble and water dispersible colorants within the water-based ink. There has been great improvement in the area of water durability of ink-jet inks through incorporation of certain ink-jet compatible latexes. The latex can comprise small micron or sub-micron hydrophobic polymeric particles of high molecular weight that are dispersed in an aqueous fluid, which fluid ultimately becomes at least part of a liquid vehicle of an ink-jet ink. When printed as part of an ink-jet ink, latex particulates of the ink can form a hydrophobic print film on a media surface, entrapping and protecting the colorant within the film. However, such latex compositions can create problems with respect to pen reliability, as well as with respect to settling of the latex over time.

Conventional latex particles are normally designed to flocculate so that latex precipitate may be easily shaken or stirred back into dispersion without agglomeration. Such flocculation behavior is well known with latex paints. Unfortunately, these conventional teachings do not address the unique needs of ink-jet printing applications. For example, it would be desired that a latex for use in an ink-jet printing application have good dispersion stability, and thus, would tend to avoid flocculation while within the ink-jet architecture. The micro-channel ink feeds in ink-jet pens are easily clogged with precipitant, particularly when a pen is stored or otherwise unused for prolonged periods of time. Such precipitation is not easily redispersed by pen shaking, as flow constriction prohibits adequate mixing within micro-channels of pen architecture. Additionally, micro-channels used for jetting can house some of the ink over prolonged periods in preparation for firing, and settled latex can cause further constricting of the micro-channels. This can result in ink-jet pen failure due to clogging of the micro-channels. The micron-order settling distances found in the fluid channels of thermal inkjet pens exacerbate the problem. Additionally, latex particles in the firing chamber of a pen are subjected to explosive thermal shear conditions. Because of this, greater inter-particulate repulsion can be greatly desired.

SUMMARY OF THE INVENTION

It has been recognized that it would be advantageous to develop latex particulates that are highly functional for use with ink-jet inks.

In accordance with this, a method of forming latex particulates having high charge density surfaces can comprise multiple steps. Such steps can include preparing a monomer emulsion including an aqueous phase and an organic monomer phase, wherein the organic monomer phase includes at least one blocked acid monomer; polymerizing the organic monomer phase to form blocked acid latex particulates dispersed in the aqueous phase; and unblocking the blocked acid latex particulates to form acidified latex particulates.

Alternatively, a latex dispersion can comprise an aqueous phase, and latex particulates dispersed in the aqueous phase. The latex particulates can include surface acid groups having a pKa less than about 4, wherein the acid groups are prepared by removing an associated blocking group present during polymerization of the latex particulates. In an alternative embodiment, the latex particulates can be prepared from a monomer mix including at least one monomer having multiple acid groups. In still another embodiment, a latex dispersion can comprise an aqueous phase and blocked acid latex particulates dispersed in the aqueous phase.

In another embodiment, a latex-containing ink-jet ink can comprise a liquid vehicle, a colorant dissolved or dispersed in the liquid vehicle, and latex particulates dispersed in the liquid vehicle. The latex particulates can be formed by the steps of preparing a monomer emulsion including an aqueous phase and an organic monomer phase, wherein the organic monomer phase includes at least one blocked acid monomer; polymerizing the organic monomer phase to form blocked acid latex particulates dispersed in the aqueous phase; and unblocking the blocked acid latex particulates to form acidified latex particulates.

In yet another embodiment, a blocked acid monomer for preparing surface acidified latex particulates can include a polymerizable group, an acid group coupled to the polymerizable group, and a blocking group coupled to the acid group, thereby rendering the acid group inactive. The blocking group can be configured to be removable after emulsion polymerization of the blocked acid monomer to reconstitute the acid group.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "ink vehicle" refers to the fluid in which colorants and latex particulates or colloids are dissolved or dispersed to form ink-jet inks in accordance with the present invention. Many liquid vehicles and vehicle components are known in the art. Typical ink vehicles can include a mixture of a variety of different agents, such as surfactants, co-solvents, buffers, biocides, sequestering agents, viscosity modifiers, and water. In one embodiment, an aqueous phase of a latex dispersion can become part of the liquid vehicle.

"Colorant" can include dyes, pigments, and/or other particulates that may be suspended or dissolved in an ink vehicle containing latex particulates prepared in accordance with embodiments of the present invention. Dyes are typically water soluble, and therefore, can be desirable for use in many embodiments. However, pigments can also be used in other embodiments. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer, an oligomer, or a surfactant, for example) in the liquid vehicle and/or in the pigment that utilizes a physical coating to aid the pigment in becoming and/or substantially remaining dispersed in a liquid vehicle.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

As used herein, "effective amount" refers to at least the minimal amount of a substance or agent, which is sufficient to achieve a desire effect. For example, an effective amount of an "ink vehicle" is at least the minimum amount required in order to create an ink composition, while maintaining properties necessary for effective ink-jetting.

The term "about" when referring to a numerical value or range is intended to encompass the values resulting from experimental error that can occur when taking measurements.

The term "freqcel" denotes a reduction in ink drop ejection velocity with increased pen firing frequency. The lowering of drop velocity can be a problem as changes in the trajectory of the fired drops can reduce drop placement accuracy on the print media. Without being bound by one particular theory, freqcel may be attributable to thermal shear stripping of surfactant from latex particles near a pen firing chamber at the time of drop nucleation. As surfactant is typically present in ink-jet inks to help separate particles, a reduction in surface-adsorbed or surface-attracted surfactant can promote greater inter-particle attraction. This can result in increased in ink viscosity, which can negatively impact ink refill and drop ejection rates from ink-jet architecture. Greater pen firing energy can be used to counteract this phenomenon, but bubble entrapment can be exacerbated at these higher viscosities, which is known to impair drop frequency performance.

The term "decel" denotes an increase in ink flow resistance within pen micro-channels, which in turn, reduces ejected drop volume. Such flow resistance can be caused by changes in ink rheology or plugged channels, and is often responsible for ink starvation within a pen firing chamber.

The term "decap" is a measure of how long a nozzle may remain inactive before plugging and how many pen firings are required to re-establish proper drop ejection.

"pKa" is related to acid dissociation, and can be used to quantify the strength of an acid. Strong acids generally have a pKa less than about 3, and weak acids typically have a pKa greater than about 3.

The term "monomer emulsion" refers to an organic monomer or monomer mix that is emulsified in an aqueous or water phase.

The term "latex" or "latex dispersion" by definition includes both latex particulates as well as the aqueous medium in which the latex particulates are dispersed.

The term "latex particulates" or "latex particles" are the polymeric masses that are dispersed in latex dispersion.

The term "blocked acid" when referring to monomers or latex particulates include acid groups that are substantially inactivated as acids by a blocking group. In accordance with embodiments of the present invention, when an acid of a monomer is blocked, it can be polymerized in the organic phase of a monomer emulsion to form a latex dispersion.

The term "blocked acid latex particulates" refers to latex particles that included blocked acid groups.

The term "acidified latex particulates" refers to acid groups of latex particulates that have been unblocked after formation to acidify at least the surface of the particulates.

As is generally known in the art, latex particulate surface charge is typically created through emulsion polymerization of an acid monomer, with or without other monomers, to form latex particulates. Such acid monomers should be sufficiently hydrophobic to substantially remain in the organic phase of the emulsion that forms the particles. The need for hydrophobicity has limited polymer design to the use of relatively weak organic acids, typically carboxylic acids, having correspondingly low ionization. However, monomers including strong acids (such as sulfonates, phosphonates, etc.), or monomers including multiple acids (such as di-acids), are excessively water soluble for typical emulsion polymerization processes. Moreover, strong acid monomers or multiple acid monomers tend to migrate out of the organic phase and into the water phase where they form detrimental water-soluble and ion-bearing polymers. The resultant increase in the ionic strength of the aqueous phase of the latex dispersion reduces the effect of the charge surrounding each particle, weakening particle dispersion stability.

In accordance with embodiments of the present invention, blocked acid monomers can be used that are generally hydrophobic in a blocked form, and can be regenerated to an acid form after emulsion polymerization of a latex particle. Such blocking allows strong and/or otherwise fully water-soluble acids, as well as multiple acid monomers, to be incorporated on a latex particulate surface, even at high concentration levels if desired. Such compositions can provide desirable particle dispersion stability. After formation of the latex particulates, the formed particles can be post-reacted in solution with a base (such as NaOH or KOH) or a strong acid (such as HCl), and/or elevated temperature to hydrolyze or otherwise remove the blocking group from the acid groups. Optionally, the unblocked acid on the surface of the latex particulates can be subsequently or simultaneously salted, which can also be desirable in some embodiments.

With this general description in mind, a method of forming latex particulates having high charge density surfaces is provided. The method includes the step of preparing a monomer emulsion including an aqueous phase and an organic monomer phase, wherein the organic monomer phase includes at least one blocked acid monomer, and preferably, includes a monomer mix that includes the blocked acid monomer. The method can also include steps of polymerizing the organic monomer phase to form blocked acid latex particulates dispersed in the aqueous phase, and unblocking the blocked acid latex particulates to form acidified latex particulates.

In an alternative embodiment, a latex dispersion can comprise an aqueous phase, and latex particulates dispersed in the aqueous phase. The latex particulates can include surface acid groups having a pKa less than about 4, wherein the acid groups are prepared by removing an associated blocking group present during polymerization of the latex particulates. In an alternative embodiment, the pKa can be that of a strong acid, i.e. less than about 3. In another embodiment, the latex particulates can be prepared from a monomer mix including at least one monomer having multiple acid groups. In still another embodiment, a latex dispersion can comprise an aqueous phase and blocked acid latex particulates dispersed in the aqueous phase.

In another embodiment, a latex-containing ink-jet ink can comprise a liquid vehicle, a colorant dissolved or dispersed in the liquid vehicle, and latex particulates dispersed in the liquid vehicle. The latex particulates can be formed by the steps of preparing a monomer emulsion including an aqueous phase and an organic monomer phase, wherein the organic monomer phase includes at least one blocked acid monomer; polymerizing the organic monomer phase to form blocked acid latex particulates dispersed in the aqueous phase; and unblocking the blocked acid latex particulates to form acidified latex particulates.

In yet another embodiment, a blocked acid monomer for preparing surface acidified latex particulates can include a polymerizable group, an acid group coupled to the polymerizable group, and a blocking group coupled to the acid group, thereby rendering the acid group inactive. The blocking group can be configured to be removable after emulsion polymerization of the blocked acid monomer to reconstitute the acid group. In one embodiment, the acid group can be directly coupled to the polymerizable group, and in another embodiment, the acid group can be directly coupled to the polymerizable group through a spacer group, such as a group including a C1 to C8 lower alkyl group or a phenyl group.

Blocked Acid Monomer

Blocked acid monomers that can be used in accordance with embodiments of the present invention can comprise a vinylic or other polymerizable entity and a blocked acid or multiple acid group(s). The vinylic group can be represented by acrylate, methacrylate, styrene, vinylether, or other alkene containing reactive group. Other polymerizable groups that can be used include condensation reactive groups, such as epoxides. Other condensation reactions include the reaction of alcohols with esters to form polyesters; the reaction of phenol, urea or melamine with formaldehyde to form condensation polymers; and the reaction of alcohols and isocyanates to form urethanes. The polymerizable group can be typically reactive under a first set of reactive conditions, and the blocked acid group can be a chemical group that is substantially hydrophobic and stable under the first set of reaction conditions. The blocked acid group, after polymerization of the monomers, can be hydrolyzed or otherwise dissociated to form an acid under a second set of conditions. More specifically, in one embodiment, the blocked acid group can be configured to remain stable during the emulsion polymerization step that forms the latex particle, and can be configured to be unblocked after latex particulate formation in a subsequent reactive step.

As stated, blocked acid monomers that can be used in accordance with embodiments of the present invention can comprise a blocked acid or multiple blocked acid groups. To exemplify, sulfonylchlorides are generally stable in water under ambient temperature conditions, while readily hydrolyzable at elevated temperature and/or under high or low pH conditions to form an acid. This is particularly true of benzylsulfonyl chlorides, such as styrenesulfonyl chloride. In another embodiment, the blocked acid can comprise an active ester. Such esters are generally weak (or active) and readily hydrolyzed under aqueous conditions of high or low pH to generate a desired acid (and its blocking alcohol) after latex polymerization. An example of such a blocked acid monomer is methyl p-vinyl phenylsulfonate. The latex particles of the present invention can be formed by emulsion polymerization from a monomer mix that includes at least one blocked acid monomer. The blocked acid monomer is preferably sufficiently polar with respect to other monomers in the monomer mix to preferentially polymerize at the particle surface to form the latex particle. In one embodiment, delayed addition of the blocked acid monomer to the polymerization reaction can provide a concentration of the blocked acid monomer on the surface. Additionally, a single blocked acid monomer can include multiple blocked acids to further increase latex charge density on a per monomer unit basis.

There are a number of acid types that can be used in the formation of blocked acid monomers in accordance with embodiments of the present invention. These include strong acids such as phosphonic acid, phosphinic acid, pyrophosphoric acid, boronic acid, sulfonic acid, sulfinic acid, phosphorous acid, hydroxamic acid, and cyanuric acid. In some embodiments, weak acids such as found in acrylic acid, methacrylic acid, and phenols can also be used.

In more detail with respect to the halogen blocked acid monomers, such acid halogens can be represented by sulphonyl chloride, sulfonyl fluoride, phosphonyl chloride, acryloylchloride, and methacrylolyl chloride, with more stable sulfonyl halides being preferred. A specific embodiment of a halogen blocked acid is exemplified by styrenesulfonyl chloride, shown in Formula 1 below:

Formula 1

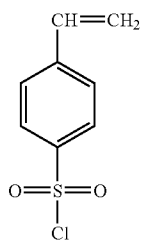

Another embodiment of a halogen blocked acid is exemplified by 2-acrylamido-2-methyl-1-propanesulfonyl chloride, shown in Formula 2 below:

Formula 2

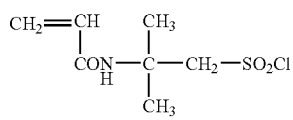

Sulfonyl chlorides are typically stable in water at ambient or room temperature, as normally used for monomer emulsification. Sulfonyl chlorides hydrolyze slowly by comparison to the rate of monomer polymerization at elevated temperatures and typically low pH. Acid halides are readily synthesized by reacting the corresponding sulfonic, phosphonic, carboxylic acid, etc., with a phosphorous pentahalide, such as phosphorous pentachloride. Such a reaction is shown by example in Formula 3, as follows:

Formula 3

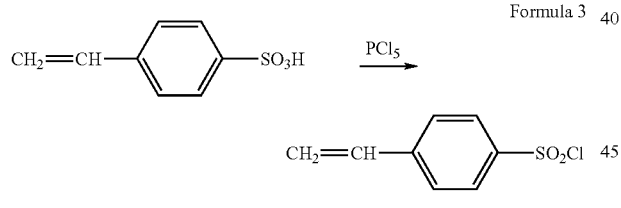

In Formula 3 above, the acid of the styrene sulfonate can be blocked through reaction with phosphorous pentachloride to form styrenesulfonyl chloride. The blocked sulfonate is hydrophobic, allowing for substantial stable incorporation of the monomer into a latex emulsion under conventional low pH polymerization conditions. Once the styrenesulfonyl chloride is polymerized into a latex particulate, the blocked styrene sulfonate of the polymer can be readily hydrolyzed in water under heat and high pH to regenerate the sulfonic acid, as shown in Formula 4 below:

Formula 4

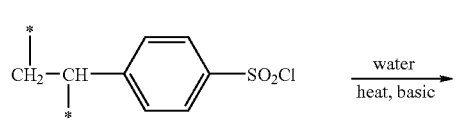

-continued

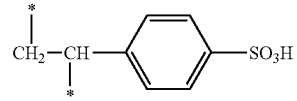

Formulas 1 to 4 merely depict specific preferred embodiments. Different combinations of halide blockers and acids can also be used, as would be known by those skilled in the art after considering the present disclosure.

In more detail with respect to ester blocked acids, amide blocked acids, and thiol ester blocked acids, such monomers can be formed by reacting an acid or its corresponding acid halide with an alcohol, amine, or thiol blocking group, respectively. Applicable acid esters include aromatic and aliphatic sulfonates, phosphonates, and carboxylates. An example of an ester blocked acid is a styrene sulfonate ester monomer, shown in Formula 5 below:

Formula 5

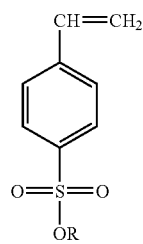

where —OR represents a lower aliphatic alcohol, phenol, or other similar blocking group. A styrene sulfonate ester, as shown in Formula 5, can be synthesized by the reaction of styrene sulfonylchloride, such as that prepared in Formula 3, with an alcohol, such as methanol or phenol. Such a reaction is provided in Formula 6, as follows:

Formula 6

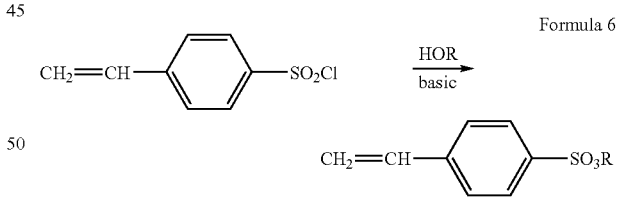

The styrene sulfonate ester is hydrophobic and, as such, remains substantially stable in the organic phase during emulsion polymerization. Once the ester of the polymerized styrene sulfonate ester hydrolyzes, the sulphonic acid can be regenerated, as shown in Formula 7 below:

Formula 7

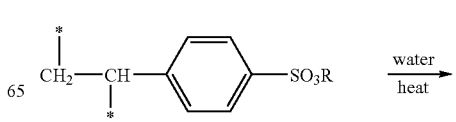

-continued

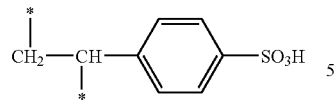
(5)

The unblocking reactivity of the formed ester, thiol ester, or amide is dependent on the collective electron withdrawing properties of the acid and blocking groups. Strong acids, such as sulfonic acid and phosphonic acid, can form weak (active) esters with many alcohols. Carboxylic acids, on the other hand, are weaker acids, and consequently may tend to require blocking groups that are more acidic, such as phenol or succinimide, to achieve comparable unblocking properties. Esters, thiol esters, and amides can undergo hydrolysis under both acid and base conditions. The acid and blocking group may be selected to achieve a desired blocking reaction condition and/or a desired unblocking condition. Suitable types of blocking groups include, but are not limited to, alcohols, phenols, thiols, thiophenols, imides, anilines, silanols, oximes, oxazolines, oxazolidines, and hydrazides. Examples of such blocking groups include methanol, ethanol, propanol, phenol, phenol esters, thiomethanol, benzenethiol, hydroxy succinimide, p-nitroaniline, trimethylsilyl chloride, acetoxime, 2-amino-2-methyl-propan-1-ol, trichloroacetaldehyde, and phenylhydrazine. A more exhaustive list of blocking or protective groups can be found in *Protective Groups In Organic Synthesis*, T. W. Greene & P. G. M. Wuts. John Wiley & Sons, Inc. 1999 (See particularly chapters 5 and 9), the entirety of which is incorporated herein by reference.

In another aspect of the present invention, blocked acid monomers for use with the present invention can comprise multiple blocked acid groups per monomer. With this arrangement, blocked acid monomers can be capable of producing greater charge density per monomer unit. An exemplary monomer having multiple acids is provided in Formula 8, as follows:

Formula 8

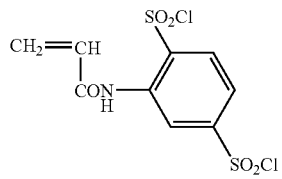

The blocked di-acid monomer shown in Formula 8 is an acryloylamidobenzene 2,5-disulfonylchloride. This di-acid monomer can be formed through the amidation reaction of acryloylchloride and aniline 2,5-disulfonate followed by the acid blocking reaction with phosphorous pentachloride, as shown in Formula 9 below:

Formula 9

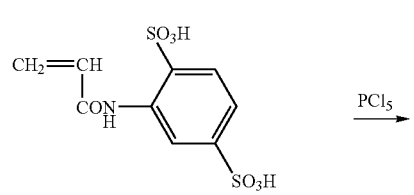

-continued

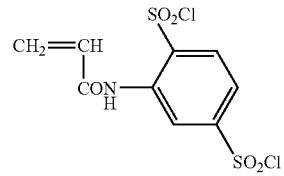

In addition to the exemplary di-acid shown in Formulas 8 and 9, there are numerous multi-acid monomers that are suitable for use in accordance with embodiments of the present invention. Examples include, but are not limited to, maleic acid, itaconic acid, citraconic acid, fumaric acid, as well as the condensation product of (meth)acryloyl chloride with multi-acids such as malic acid, citric acid, and 1-amino 4,6-dicarboxylic naphthalene. In general, such multi-acid monomers tend to be too hydrophilic for successful incorporation into latex particles formed through conventional emulsion polymerization methods. However, when the multi-acid groups are blocked according to the teachings of this invention, the multi-acid monomers can be suitably hydrophobic for copolymerization using emulsion polymerization techniques. In addition to the blocking reaction shown in Formula 9, the acids of the multi-acid monomers can be blocked in a similar manner as described with respect to the single acid monomers described above.

One skilled in the art will appreciate that there are many combinations of polymerizable groups, acid groups, and blocking groups that can be combined in accordance with embodiments of the present invention, many of which are not expressly stated herein. After considering the present disclosure, these combinations would be apparent to one skilled in the art, and as such, these combinations are included within the scope of the present invention. Likewise, the embodiments for acid blocking are not meant to be limiting, as other blocking chemistries are also contemplated. For example, the use of acetyls and anhydrides as blocking agents is within the scope of the present invention.

Latex Dispersion

The blocked acid monomers prepared in accordance with embodiments of the present invention can be used to form latex particulates that have acid functionalized surfaces. The aforementioned blocked acid monomer can be included in a monomer mix (if copolymerizing with other monomers), and the monomer mix can be incorporated in a pre-emulsion in preparation for emulsion polymerization to form the latex. In one embodiment, if used in a monomer mix, the blocked acid monomer can comprise from 0.5 wt % to 20 wt % of the latex monomer mix. In embodiments where the blocked acid monomer is concentrated at the surface, the amount of blocked acid monomer in the monomer mix for inclusion at the surface can be from 0.5 wt % to 50 wt %, or even greater. In either embodiment, the blocked acid monomer of the entire bulk, whether concentrated at the surface or throughout the entire bulk, can be present at from 2 wt % to 6 wt %. These ranges are merely exemplary; as it is possible to form a latex particle that includes 100 wt % blocked acid monomer. Additionally, depending on whether the blocked acid monomer is configured to be concentrated at or near the surface of the latex particulates, or is randomly distributed throughout the latex particulates, such a consideration will have an affect on how much blocked acid monomer may be desirable to use for a given latex preparation.

In a first process, the blocked acid, and optionally additional monomers, can be homogeneously added to a reaction bath and form approximately homogeneous latex particles. In other words, the blocked acid monomer can be polymerized with the monomer mix to essentially randomly distribute the blocked acid polymerized monomer throughout the entire mass of the latex particulate. In an alternative embodiment, a blocked acid monomer can be added toward the end of monomer addition to promote blocked acid monomer polymerization predominantly at or near the surface of the formed latex particles. As surface acids are primarily responsible for providing particle dispersion stability, having acid groups concentrated at the surface can provide good hydrophobic bulk properties for print or coating film durability, while at the same time, require the use of less blocked acid monomer.

Surfactants can be used during the polymerization process to control particle size, as well to disperse the formed latex particles prior to removing the blocking group form the blocked surface acids. As is generally known in the latex arts, latex particles are typically produced in an acidic environment in order to utilize acidic free radical initiators, such as persulfate initiators. Halide and some ester blocked acids can remain adequately stable in such environments, and thus, can be suitable for use in accordance with embodiments of the present invention.

Following latex polymerization, the blocked acids incorporated in the latex polymer may be readily unblocked through hydrolysis at elevated temperature and/or lowered or increased pH, depending on the blocking system used. For example, the addition of a base, such as KOH, can raise the solution pH and neutralize the formed acid. Thus, in one embodiment, the blocked acid can be liberated from the blocking group, and the potassium (K) can be used to salt the exposed acid, if such neutralization is desired. In addition to the use of a blocked acid monomer, the latexes of the present invention can incorporate mixtures of monomers and dimers that contribute to other desired properties, such as controlling latex polymer glass transition temperature, density, dielectric constant, solvent parameters, etc.

To provide an example of a more complex type of latex structure that can be formed in accordance with embodiments of the present invention, Formula 10 is provided below:

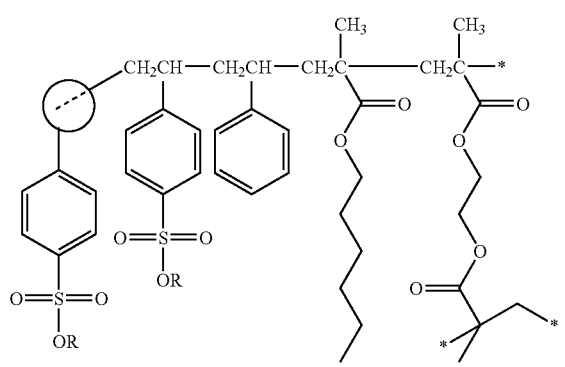

Formula 10

In Formula 10 above, a blocked styrene sulfonic acid is shown at the surface of the particulate, whereas copolymerized monomers which include a blocked styrene sulfonic acid is shown as part of the bulk or inner core of the particle beneath the surface. The production of a charge on the surface of latex particles includes a first step of synthesis of the latex with a blocked acid monomer. The blocked acid monomer, once polymerized in a monomer mix to form a latex particulate, as shown in Formula 10, can then be unblocked as described previously. This method allows for inclusion of very strong acid groups on the surface of latex particulates, while minimizing formation of solution ions. The inclusion of strong acids on the surface of latex particles can be particularly advantageous for use in thermal ink-jet applications.

Prior to the present invention, typical acids that have been used to acidify the surface of latex particulates included carboxyl acids. Carboxylic acids are weak acids that have been fairly effective for use in latex/ink-jet ink systems. However, the use of a stronger acid, or multiple acids on a single monomer, can provide better dispersion stability in aqueous systems. Prior to the present invention, the incorporation of strong acids or multiple acids on a single monomer, has been difficult due to the constraints of emulsion polymerization systems. This is because acidic monomers, particularly strongly acidic monomers and/or multiple acid monomers, are not easily copolymerized within an organic phase of an emulsion, as the strong acid tends to favor being drawn into the aqueous phase of the emulsion. To illustrate the problem by example, methacrylic acid functionalized latex particulates can be formed using 6 wt % methacrylic acid-containing monomers. However, only about half of the methacrylic acid monomers will stay in the organic phase, and the balance tends to migrate to the aqueous phase of the emulsion, increasing the viscosity and the ionic strength of the aqueous phase. This is significant as methacrylic acid is a relatively weak acid. Thus, the problems associated with incorporating strong acids, or multiple acids on a single monomer, are exacerbated when preparation is attempted using traditional emulsion polymerization processes. By blocking acid monomers, the monomer becomes more hydrophobic and will tend to stay in the organic phase, and once the monomers of the organic phase have polymerized to form latex particulates, the acid groups can be unblocked as described previously. As there is less monomer that migrates to the aqueous phase, the aqueous phase is not as significantly affected by the monomers. As a result, the aqueous phase can substantially maintain its inherent properties, and the latex particulates can exhibit greater dispersion stability due to the presence of stronger surface acid groups, or by the greater number of surface acid groups provided by multiple acid monomers. This being stated, single weak acid monomers can also be prepared in accordance with the methods of the present invention.

One way to characterize the latex particulate surface acidity that can be achieved in accordance with embodiments of the present invention is by pKa values. A lower pKa indicates a stronger acid, and thus, typically better stabilization of latex particles in an aqueous dispersion. Acrylic acid has a pKa of about 4.25 and methacrylic acid is a slightly weaker acid, and thus has a slightly higher pKa. Styrene sulfonate has a pKa of approximately 0.7. Additionally, phosphoric acid is expected to be very close in pKa to styrene sulfonate. In accordance with an embodiment of the present invention, pKa values that are less than that of acrylic acid and methacrylic acid can be achieved. Specifically, pKa values less than about 4, and even less than 3, 2, or 1 can be achieved in accordance with embodiments of the present invention. pKa values less than about 3 are considered to be strong acids.

Ink-Jet Inks

Latex polymer printability and print reliability are highly correlated to the charge density on each particle surface. In general, charge density for ink-jet application is preferably greater than typically found in commercial latexes used for other purposes. This is because the repulsive ionic forces that separate dispersed latex particles should be greater than normal to prevent particle impact under the explosively high shear conditions present in ink-jet architectures, particularly thermal ink-jet architectures. However, attainable high charge strength and/or density on latex particles has been greatly limited by the emulsion polymerization process used to synthesize the particles. The use of blocked acid monomers in accordance with embodiments of the present invention has enabled the production of latex particulates with strong acid surfaces, and/or the presence of multiple acid-containing units. Additionally, the use of blocked acid monomers can also be used to form weaker acid-functionalized latex particulate surfaces without excessive amounts of the acid monomer migrating from the organic phase to the aqueous phase of the emulsion.

The latexes of the present invention can incorporate mixtures of monomers and dimers that provide other ink-jet ink desired properties, such as controlling latex polymer glass transition temperature, density, dielectric constant, solvent parameters, etc. If utilizing the latexes of the present invention for jetting from thermal ink-jet architecture, the latex particles can be configured to perform under thermal ink-jet printing conditions. For example, the polymer glass transition temperature of the latex particulates can be in the range of 10° C. to 20° C., the latex particulates can be within a density range from 1.0 to 1.05 g/cm$^3$, the particle surface dielectric constant of the latex particulates can be below 2.8, and/or a 1 wt % to 2 wt % dimer crosslinking agent can be present in the latex particulates. These properties can be selected individually or in combination to contribute to desired ink performance relative to thermal shear stability, freqcel, decel, decap, particle settling, and co-solvent resistance.

A typical liquid vehicle formulation that can be used with the latexes described herein can include water, and optionally, one or more co-solvents present in total at from 0 wt % to 30 wt %, depending on the ink-jet architecture. Further, one or more non-ionic, cationic, anionic, or amphoteric surfactant(s) can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the ink vehicle is predominantly water.

It is to be noted that the latex dispersions of the present invention inherently include a predominantly aqueous phase (or liquid phase) that can include water and other components, such as surfactants, solvents, etc. Thus, the liquid phase of the latex dispersion can be admixed with liquid vehicle components to form the liquid vehicle, or the liquid phase can become the liquid vehicle upon addition of colorants.

Classes of co-solvents that can be used in the liquid vehicle can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the ink vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

With respect to the colorant, an effective amount of either pigment and/or dye can be used to provide desired color or other property to the ink-jet ink. In one embodiment, the colorant can be present at from 0.1 wt % to 10.0 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Latex Incorporating Methacrylic Acid Monomer (229 nm—Control)

About 1160 ml of water was heated in a reactor to 90° C. A solution of 1.39 g of potassium persulfate initiator in 160 ml of water was also prepared. An initial 32 ml of this initiator solution was added to the reactor bath and stirred. Separately, a first monomer emulsion comprising 78.48 g styrene, 277.92 g hexyl methacrylate, 3.6 g ethylene glycol dimethacrylate, 1.44 g isooctylthio glycolate chain transfer agent, and 29.95 g of 30% Rhodafac RS 710 was prepared in 122.4 ml water. Additionally, a second monomer emulsion comprising 5.52 g styrene, 20.08 g hexyl methacrylate, 14 g methacrylic acid, 0.4 g ethylene glycol dimethacrylate, 0.16 g isooctylthio glycolate, and 3.33 g of 30% Rhodafac RS 710 was separately prepared in 13.6 g water. The first monomer emulsion was added dropwise to the reaction vessel over a 30 minute period and stirred. Simultaneously, 110 g of the initiator solution was dropwise added to the reaction vessel over the same period. Fifteen minutes following completion of the first monomer emulsion and initiator feeds, the second monomer emulsion was added dropwise to the reaction bath over a period of 3 minutes. The remaining 18 g of initiator solution was added dropwise to the reaction bath over the same 3 minute period. The reaction was stirred and maintained at 90° C. for an additional 1.75 hours. About 0.5 g t-butyl peroxide was then added to the reactor with continued heating for 15 minutes. The reaction was then allowed to cool to 50° C. Potassium hydroxide (50% in water) was then added to bring the formed latex solution to a pH of 8.5. The contents were cooled to ambient temperature, and the latex solution was subsequently filtered with a 200 mesh filter to obtain a 20.7% solids latex dispersion including latex particulates with an average particle size of about 229 nm. The amount of acid in this latex was about 40.7 millimoles.

Example 2

Preparation of p-styrenesulfonyl Chloride Blocked Acid Monomer

About 320 g of phosphorus pentachloride was taken in a three-neck round-bottomed flask. One neck was fitted with a mechanical stirrer, and a second neck was fitted with a plastic tube to collect hydrochloric acid produced by the reaction. About 190 g of p-styrenesulfonate sodium salt was added in small portions to the phosphorus pentachloride through the third neck while cooling the flask to 0° C. After the addition, the contents were allowed to stir at ambient temperature for 2 hours. Deionized ice water was then added dropwise to the flask, cooling the contents again to 0° C. The mixture was transferred to a separating funnel using additional water. An oily organic layer was collected and the remaining aqueous solution was extracted with dichloromethane. The organic layer was then combined and dried with anhydrous sodium sulfate. This solution was filtered through a small silica gel (100 g) column. The filtrate was collected and dichloromethane was removed under vacuum to obtain 125 g of p-styrenesulfonyl chloride blocked acid monomer.

Example 3

Preparation of Latex Incorporating p-styrenesulfonyl Chloride Blocked Acid Monomer (150 nm)

About 1160 ml of water was heated in a reactor to 90° C. A solution of 1.39 g potassium persulfate initiator in 160 ml water was prepared. An initial 32 ml of this initiator solution was added to the reactor bath and stirred. Separately, a first monomer emulsion comprising 77.56 g styrene, 278.84 g hexyl methacrylate, 3.6 g ethylene glycol dimethacrylate, 1.44 g isooctylthio glycolate chain transfer agent, and 29.95 g of 30% Rhodafac RS 710 was prepared in 122.4 ml water. A second monomer emulsion comprising 6 g styrene, 21.6 g hexyl methacrylate, 12 g p-styrenesulfonyl chloride (blocked acid monomer of Example 2), 0.4 g ethylene glycol dimethacrylate, 0.16 g isooctylthio glycolate, and 3.33 g of 30% Rhodafac RS 710 was separately prepared in 13.6 g of water. The first monomer emulsion was added dropwise to the reaction vessel over a 30 minute period and stirred. Simultaneously, 110 g of the initiator solution was added dropwise to the reaction vessel over the same period. Fifteen minutes following completion of the first monomer emulsion and initiator feeds, the second monomer emulsion was added dropwise to the reaction bath over a period of 5 minutes. The remaining 18 g of initiator solution was added dropwise to the reaction bath over the same 5 minute period. The reaction was stirred and maintained at 90° C. for an additional 1.5 hours. About 0.3 g. t-butyl peroxide was then added to the reactor with continued heating for 15 minutes. The reaction was then allowed to cool to 50° C. Potassium hydroxide (50% in water) was added to bring the formed latex solution to a pH of 9.2. The solution was then stirred at 90° C. for an additional 1.5 hours during which the pH dropped to 6.8 (due to release of HCl resulting from the unblocking). The contents were cooled to ambient temperature, after which additional potassium hydroxide was added to adjust the pH to 8.5 and to salt the surface acid groups. The latex solution was subsequently filtered with a 200 mesh filter to obtain 20.0% solids latex solution having a particle size of 150 nm. The amount of acid in this latex was 14.8 millimoles.

Example 4

Preparation of Latex Incorporating p-styrenesulfonyl Chloride Blocked Acid Monomer (233 nm)

About 650 ml of water was heated in a reactor to 90° C. Separately, an initiator solution of 1 g potassium persulfate in 100 ml of water was also prepared. Further, a first feed of monomers was prepared by emulsifying 38.8 g of styrene, 139.4 g of hexyl methacrylate, 1.8 g or ethylene glycol dimethacrylate, and 0.72 g of isooctylthio glycolate in 63 ml of water with 12 g of 30% Rhodafac RS 710. Additionally, a second feed of monomers was prepared by emulsifying 15.8 g of hexyl methacrylate, 4.0 g of p-styrenesulfonyl chloride (blocked acid monomer of Example 2), 0.2 g of ethylene glycol dimethacrylate, and 0.08 g of isooctylthio glycolate in 7 ml of water with 1.33 g of 30% Rhodafac RS 710. The initiator solution was added to the reactor at a rate such that it would last for about 26 minutes. After 3 minutes of adding the initiator to the reactor, the first feed of monomers was added for 19 additional minutes. After the 19 minutes, the addition of the first feed of monomers and the initiator was ceased. After allowing the composition to stand for 15 minutes, the remaining initiator solution and the second feed of monomers were added over a period of 4 minutes. The reactor was maintained at 90° C. for another 1.5 hours. The residual monomers were reduced by adding 0.3 g of t-butyl peroxide and heating the reactor for another 0.5 hours. Potassium hydroxide (50% in water) was added to bring the pH of the latex polymer to 10, and heating was continued at 90° C. for another 1 hour. The contents were cooled to ambient temperature and the pH was adjusted to 8.5. The product was filtered with a 200 mesh filter to obtain a latex with 18.5% solids having an average particle size of about 233 nm.

Example 5

Preparation of Latex-Containing Ink-Jet Inks

The latexes prepared in accordance with Examples 1, 3, and 4 were each formulated into inks containing 6 wt % 2-pyrrolidone, 7 wt % 1,2-alkanediol, 5 wt % ethoxylated glycerol, 5 wt % glycerol, 1 wt % ethoxylated secondary alcohol surfactant, 0.02 wt % fluorinated surfactant, 0.02 wt % biocide, 3 wt % of a self-dispersed pigment, and 4 wt % latex solids. The balance of each ink-jet ink was water.

Example 6

Comparison of Print Results

Two of the ink-jet inks of Example 5 (using Example 1 latex and Example 4 latex) were separately introduced into identical thermal ink-jet pens and printed using a series of drop frequency diagnostics on paper. In this example, the Example 4 latex and the Example 1 latex were compared as they had substantially same size latex particulate size. The sulfonic acid containing latex of Example 4 significantly outperformed the carboxylic acid containing latex of Example 1 in all print performance metrics, including print acuity and density with drop frequency and decap. The sulfonic acid-containing latex ink showed excellent print performance beyond 30 KHz drop frequency and allowed a 16 second decap time. The carboxylic acid-containing latex inks performed poorly above 24 KHz and allowed for only an 8 second decap time.

Example 7

Comparison of Print Results

Two of the ink-jet inks of Example 5 (using Example 1 latex and Example 3 latex) were introduced into identical thermal ink-jet pens and printed using a series of drop frequency diagnostics on paper. In this example, the Example 3 latex and the Example 1 latex were compared, though they had a different latex particulate size. The smaller sized latex particulates as prepared in Example 3 (150 nm) was not achievable using the method described in Example 1. The sulfonic acid containing latex of Example 3 significantly outperformed the carboxylic acid containing latex of Example 1 in all print performance metrics, including print acuity and density with drop frequency and decap. The sulfonic acid-containing latex ink showed excellent print performance beyond 30 KHz drop frequency and allowed a 16 second decap time. The carboxylic acid-containing latex inks performed poorly above 24 KHz and allowed for only an 8 second decap time.

The results of this example are particularly impressive considering that the computed surface acid concentration on the sulfonic acid-containing latex particle is approximately one fourth of that on the carboxylic acid particle, given the difference in particle surface area and total molar acid concentration. This differential is both true of the covalently attached acid and absorbed surfactant acid concentrations. Moreover, by incorporating stronger acids on the surface, the enablement of printing smaller than 150 nm latex particles becomes more practical. The relatively weak carboxylic acid provided by (meth)acrylic acid-type monomers at low surface acid concentrations induced with small particles (large total surface area) provides insufficient latex charge stabilization for thermal ink-jet operating conditions. The introduction of sulfonic acid (or other strong acid) in accordance with the teachings of the present invention has not only allowed excellent printability at 150 nm particle size or less, but has provided improved printability and pen reliability over carboxylic acid containing latexes having particle sizes ranging from 150 nm through 500 nm. This is not to say that blocked carboxylic acids cannot be used in accordance with embodiments of the present invention, but that strong acids that have previously been difficult to use for modification of latexes can now be used in accordance with embodiments of the present invention.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A latex-containing ink-jet ink, comprising:
    a) a liquid vehicle;
    b) a colorant dissolved or dispersed in the liquid vehicle;
    c) latex particulates dispersed in the liquid vehicle, said latex particulates formed by the steps of:
        i. preparing a monomer emulsion including an aqueous phase and an organic monomer phase, said organic monomer phase including at least one blocked acid monomer,
        ii. polymerizing monomers of the organic monomer phase to form blocked acid latex particulates dispersed in the aqueous phase, and
        iii. unblocking the blocked acid latex particulates to form acidified latex particulates and released blocking groups; and
    d) released blocking groups
wherein the blocked acid monomer includes a blocked strong acid group selected from the group consisting of blocked phosphonic acid, blocked phosphinic acid, blocked pyrophosphoric acid, blocked boronic acid, blocked sulfonic acid, blocked sulfinic acid, blocked phosphorous acid, blocked hydroxamic acid, and blocked cyanuric acid.

2. A latex-containing ink-jet ink as in claim 1, wherein the aqueous phase is part of the liquid vehicle.

3. A latex-containing ink-jet ink as in claim 1, wherein the colorant is a pigment.

4. A latex-containing ink-jet ink as in claim 3, wherein the pigment is a self-dispersed pigment.

5. A latex-containing ink-jet ink as in claim 3, wherein the pigment is a polymer-dispersed pigment, and wherein the ink-jet ink further comprises a pigment dispersing agent.

6. A latex-containing ink-jet ink as in claim 1, wherein the blocked acid monomer includes an acid blocked by a member selected from the group consisting of halide, ester, thiol ester, and amide.

7. A latex-containing ink-jet ink as in claim 1, wherein the acidified latex particulates have surface acid groups having a pKa less than about 4.

8. A latex-containing ink-jet ink as in claim 1, wherein the acidified latex particulates have surface acid groups having a pka less than about 3.

9. A latex-containing ink-jet ink as in claim 1, wherein the blocked acid monomer used to prepare the acidified latex particulates includes multiple blocked acid groups.

* * * * *

UNITED STATES PATENT AND TRADEMARK OFFICE
CERTIFICATE OF CORRECTION

PATENT NO.         : 7,371,273 B2
APPLICATION NO. : 10/741536
DATED                : May 13, 2008
INVENTOR(S)      : Kent D. Vincent et al.

It is certified that error appears in the above-identified patent and that said Letters Patent is hereby corrected as shown below:

On the title page, item (57), under "Abstract", in column 2, line 1, after "present" insert -- invention --.

In column 18, line 57, in Claim 8, delete "pka" and insert -- pKa --, therefor.

Signed and Sealed this

Fifth Day of May, 2009

JOHN DOLL
*Acting Director of the United States Patent and Trademark Office*